US007151924B2

(12) United States Patent
Hayashi (10) Patent No.: US 7,151,924 B2
(45) Date of Patent: Dec. 19, 2006

(54) COMMUNICATION SYSTEM, HOLD CONTROL METHOD THEREFOR, TELEPHONE SET, CONTROL METHOD THEREFOR AND RECORDING MEDIUM (75) Inventor: Keiichi Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 10/638,367

(22) Filed: Aug. 12, 2003

(65) Prior Publication Data

US 2004/0032939 A1    Feb. 19, 2004

(30) Foreign Application Priority Data

Aug. 14, 2002 (JP) ............................. 2002/236172

(51) Int. Cl.
*H04Q 7/22* (2006.01)
(52) U.S. Cl. ............................. 455/414.1; 379/201.02; 379/208.01; 379/210.02; 379/157; 379/88.13; 379/93.01; 379/93.09
(58) Field of Classification Search ................ 455/512, 455/516, 527, 414.1, 414.4, 412.2, 416, 418, 455/419; 379/215.01, 157, 142.08, 142, 379/201.01, 88.13, 93.09, 93.01, 393, 201.02, 379/208.01, 210.02
See application file for complete search history.

(56) References Cited

U.S. PATENT DOCUMENTS 5,263,084 A * 11/1993 Chaput et al. ......... 379/215.01
6,470,196 B1 * 10/2002 Yamashita ................. 455/567
6,563,915 B1 * 5/2003 Salimando ............. 379/208.01
6,678,517 B1 * 1/2004 Naim et al. ............... 455/414.1
6,751,306 B1 * 6/2004 Himmel et al. ......... 379/201.02
2002/0022500 A1 * 2/2002 Minematsu .................. 455/556
2002/0118810 A1 * 8/2002 Akhteruzzaman et al. ...................... 379/212.01
2002/0122401 A1 * 9/2002 Xiang et al. ................. 370/338

FOREIGN PATENT DOCUMENTS

GB        2370190 A     6/2002

* cited by examiner

*Primary Examiner*—Joseph Feild
*Assistant Examiner*—Olumide Ajibade-Akonai
(74) *Attorney, Agent, or Firm*—Sughrue Mion, PLLC (57) ABSTRACT There is obtained a telephone set capable of preventing a noise generated by an operation of application software during voice communication from being sent to a speech counterpart. In a mobile telephone set, if a user operates activated application software other than voice communication related application software when the mobile telephone set is in voice communication with another telephone set via a communication network, the mobile telephone set requests hold of the voice communication from the communication network. This causes the voice communication to be held, thereby preventing a noise generated by the above operation from being sent to the another telephone set.

47 Claims, 6 Drawing Sheets

| TYPE | ID | HOLD CONTROL INFORMATION |
|---|---|---|
| A | 100 | 1 |
| B | 101 | 0 |
| C | 102 | 1 |
| C | 103 | 1 |
| A | 104 | 0 |
| · | · | · |
| · | · | · |
| · | · | · |
| · | · | · |
| · | · | · |
| · | · | · |
| · | · | · |
| · | · | · |
| A | NNN | 0 |

"TYPE" INDICATES TYPE OF APPLICATION SOFTWARE.

EXAMPLE:
A : USER DATA PROCESSING
B : SETTING
C : DATA COMMUNICATION PROCESSING

"ID" IS IDENTIFICATION INFORMATION FOR DISTINGUISHING APPLICATION SOFTWARE.

EXAMPLE:
100 : TELEPHONE DIRECTORY APPLICATION
101 : DISPLAY OF TELEPHONE NUMBER OF TELEPHONE SET
102 : BROWSER
103 : MAILER

"HOLD CONTROL INFORMATION" INDICATES WHETHER APPLICATION SOFTWARE NEEDS HOLD CONTROL.

0 : HOLD CONTROL UNNECESSARY
1 : HOLD CONTROL NECESSARY

COMMUNICATION SYSTEM, HOLD CONTROL METHOD THEREFOR, TELEPHONE SET, CONTROL METHOD THEREFOR AND RECORDING MEDIUM

BACKGROUND OF THE INVENTION

1. Field of the Invention

The present invention relates to a communication system, a hold control method therefor, a telephone set, a control method therefor and a recording medium, and in particular to a telephone set capable of executing multiple processings in parallel and a communication system using it.

2. Description of the Related Art

Traditionally, there has been provided a mobile telephone set capable of causing multiple pieces of application software to operate in parallel. For example, application software other than voice communication application software can be activated during voice communication (voice speech) to the extent allowed by processing power of memory or CPU of the mobile telephone set.

However, a conventional mobile telephone set has a problem that a user's operation of application software operating in parallel to application software related to voice communication causes a noise and the noise is sent to a speech counterpart through a microphone of the telephone set.

BRIEF SUMMARY OF THE INVENTION

The object of the present invention is to provide a communication system, a hold control method therefor, a telephone set, a control method therefor and a recording medium enabling prevention of a noise generated by operation of application software during voice communication from being sent to a speech counterpart.

A communication system according to the present invention comprises a telephone set capable of executing multiple processings in parallel and a communication network to which the telephone set is connected; the telephone set having hold requesting means for, in response to a user's operation for a processing other than voice communication processing activated during voice communication, requesting hold of the voice communication from the network side; and the network having hold control means for, in response to the request by the telephone set, holding the voice communication.

An another communication system according to the present invention comprises a telephone set capable of executing multiple processings in parallel and a communication network to which the telephone set is connected; the telephone set having hold control means for, in response to a user's operation for a processing other than voice communication processing activated during voice communication, holding the voice communication.

In the communication system, the telephone set further has a microphone, and the hold control means turns off the microphone and sends a hold tone to a communication counterpart of the voice communication via the network to hold the voice communication.

A hold control method according to the present invention is a hold control method for a communication system comprising a telephone set capable of executing multiple processings in parallel and a communication network to which the telephone set is connected; the method comprising: a hold requesting step of, in response to a user's operation for a processing other than voice communication processing activated during voice communication, requesting hold of the voice communication from the network side, in the telephone set; and a hold control step of, in response to the request by the telephone set, holding the voice communication, in the network.

Another hold control method according to the present invention is a hold control method for a communication system comprising a telephone set capable of executing multiple processings in parallel and a communication network to which the telephone set is connected; the method comprising a hold control step of, in response to a user's operation for a processing other than voice communication processing activated during voice communication, holding the voice communication, in the telephone set.

In the hold control method, the hold control step turns off a microphone provided for the telephone set and sends a hold tone to a communication counterpart of the voice communication via the network to hold the voice communication.

A telephone set according to the present invention is a telephone set capable of executing multiple processings in parallel; the telephone set comprising hold requesting means for, in response to a user's operation for a processing other than voice communication processing activated during voice communication, requesting hold of the voice communication from a communication network to which the telephone set is connected.

Another telephone set according to the present invention is a telephone set capable of executing multiple processings in parallel; the telephone set comprising hold control means for, in response to a user's operation for a processing other than voice communication processing activated during voice communication, holding the voice communication.

The telephone set further has a microphone; wherein the hold control means turns off the microphone and sends a hold tone to a communication counterpart of the voice communication via a communication network to hold the voice communication.

A control method according to the present invention is a control method for a telephone set capable of executing multiple processings in parallel; the control method comprising a hold requesting step of, in response to a user's operation for a processing other than voice communication processing activated during voice communication, requesting hold of the voice communication from a communication network to which the telephone set is connected.

Another control method according to the present invention is a control method for telephone set capable of executing multiple processings in parallel; the method comprising a hold control step of, in response to a user's operation for a processing other than voice communication processing activated during voice communication, holding the voice communication.

In the control method, the hold control step turns off a microphone provided for the telephone set and sends a hold tone to a communication counterpart of the voice communication via a communication network to hold the voice communication.

A recording medium according to the present invention is a recording medium having recorded thereon a program executable on a computer to implement a control method for a telephone set capable of executing multiple processings in parallel; the program comprising a hold requesting step of, in response to a user is operation for a processing other than voice communication processing activated during voice communication, requesting hold of the voice communication from a communication network to which the telephone set is connected.

Another recording medium according to the present invention is a recording medium having recorded thereon a program executable on a computer to implement a control method for a telephone set capable of executing multiple processings in parallel; the program comprising a hold control step of, in response to a user's operation for a processing other than voice communication processing activated during voice communication, holding the voice communication.

In the recording medium, the hold control step turns off a microphone provided for the telephone set and sends a hold tone to a communication counterpart of the voice communication via a communication network to hold the voice communication.

Operation of the present invention is as follows. In a telephone set capable of executing multiple processings in parallel, when a voice communication processing and other processings are activated, hold of the voice communication is requested from the network side in response to a user's operation for the processing other than the voice communication processing. In response to the request, the network holds the voice communication.

In a telephone set capable of executing multiple processings in parallel, when a voice communication processing and other processings are activated, a microphone provided for the telephone set is off and a hold tone is sent to a network in response to a user's operation for the processing other than the voice communication processing. The hold tone sent from the telephone set is received by a counterpart of the voice communication via the network.

DETAILED DESCRIPTION OF THE PREFERRED EMBODIMENTS

Figure 1:
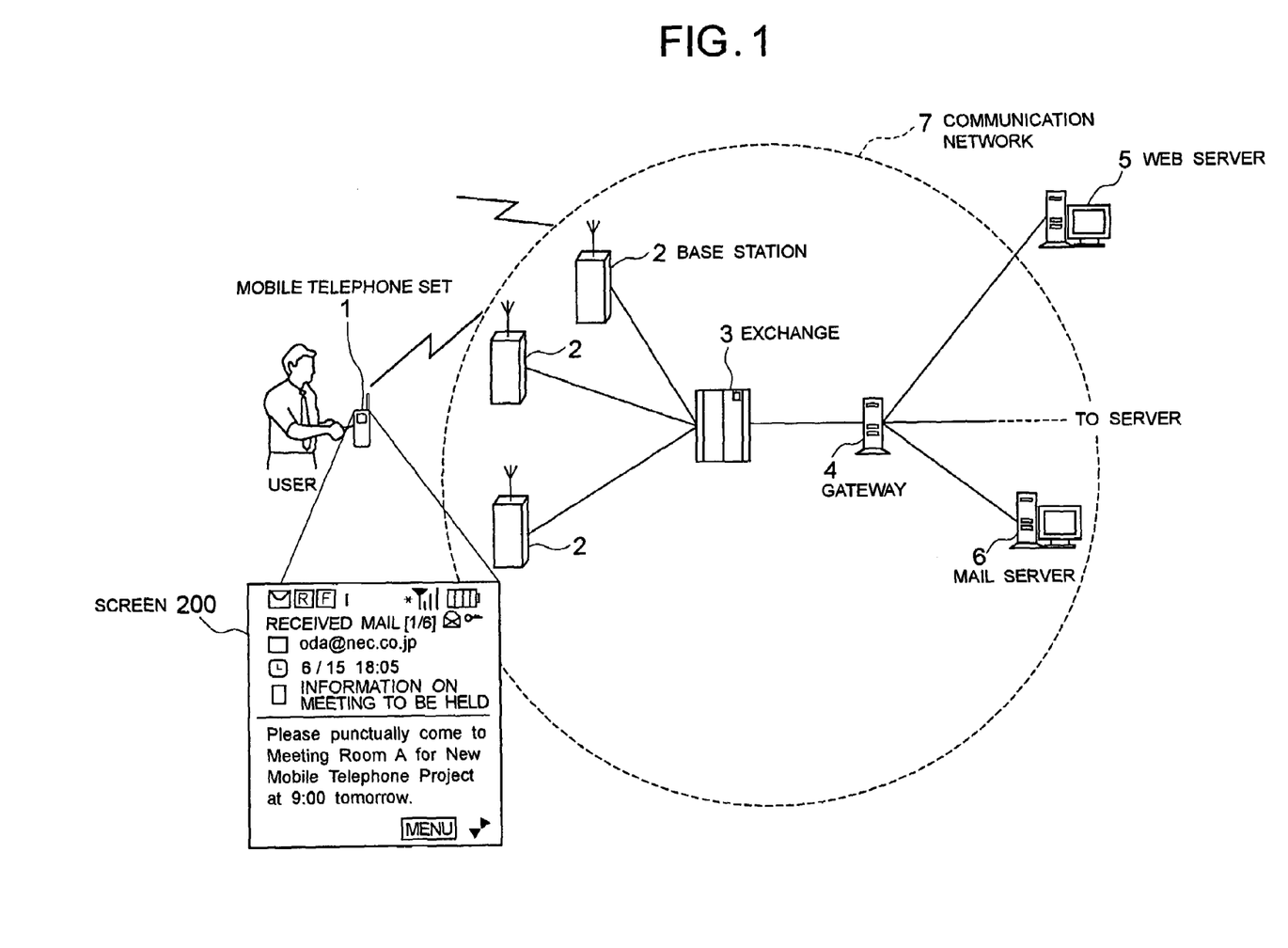
FIG. 1 shows a configuration of a mobile communication system according to an embodiment of the present invention.

An embodiment of the present invention is now described with reference to drawings. FIG. 1 shows a configuration of a mobile communication system according to the embodiment of the present invention. As shown in FIG. 1, the mobile communication system according to the embodiment of the present invention is provided with a mobile telephone set 1, base stations 2, an exchange 3, a gateway 4, a web server 5 and a mail server 6. A communication network 7 is a mobile telephone network, the Internet and the like and includes the base stations 2, the exchange 3 and the gateway 4. A screen 200 shows an example of a display screen of the display of the mobile telephone set 1.

The mobile telephone set 1 can perform data communication with the web server 5 or the mail server 6 via the base station 2, the exchange 3 and the gateway 4. The mobile telephone set 1 can also perform voice communication (voice speech) with other mobile telephone sets (not shown) and fixed telephone sets (not shown) via the base station 2 and the exchange 3.

Figure 2:
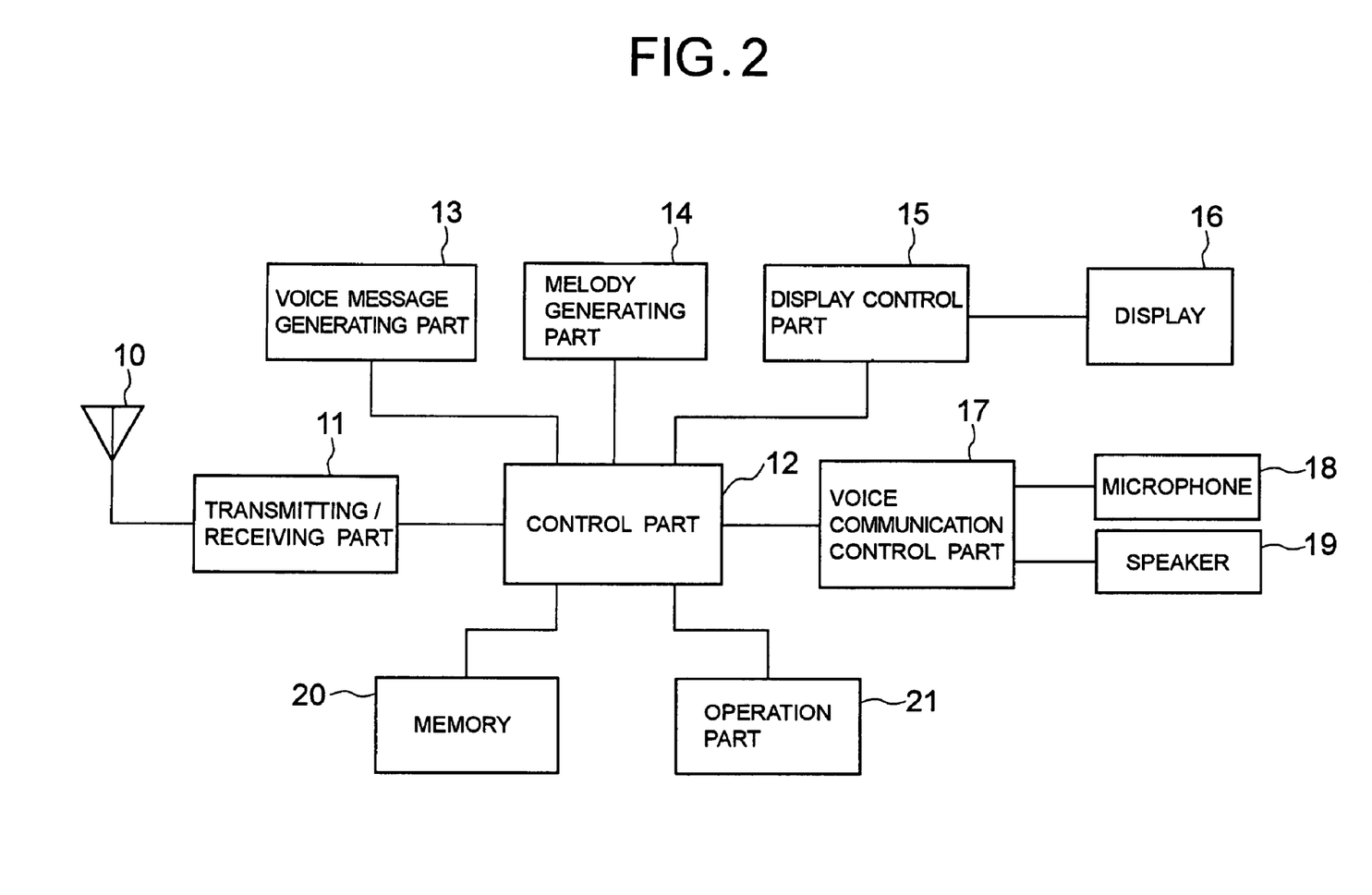
FIG. 2 shows a configuration of a mobile telephone set shown in FIG. 1.

FIG. 2 shows a configuration of the mobile telephone set 1 shown in FIG. 1. As shown in FIG. 2, the mobile telephone set 1 is provided with an antenna 10, a transmitting/receiving part 11, a control part 12, a voice message generating part 13, a melody generating part 14, a display control part 15, a display 16, a voice communication control part 17, a microphone 18, a speaker 19, a memory 20 and an operation part 21.

The transmitting/receiving part 11 transmits and receives signals via the antenna 10 under the control of the control part 12. The control part 12 operates according to a program stored in advance in the memory 20 and controls each part of the mobile telephone set 1.

The voice message generating part 13 generates a voice message to notify a speech counterpart of hold of voice communication in response to a direction by the control part 12. The melody generating part 14 generates a melody to notify a speech counterpart of hold of voice communication in response to a direction by the control part 12.

The display control part 15 performs display control to display various kinds of information on the display 16 under the control of the control part 12. The display 16 is a LCD (liquid crystal display) or the like. The voice communication control part 17 amplifies a voice signal inputted from the control part 12 to output it from the speaker 19, and amplifies a voice signal inputted from the microphone 18 to output it to the control part 12.

There is stored in the memory 20 in advance an application software management information table described later. The operation part 21 is used by a user to operate the mobile telephone set 1. The user can use the operation part 21 to activate various kinds of application software of the mobile telephone set 1 and operate each of the activated application software.

Figure 3:
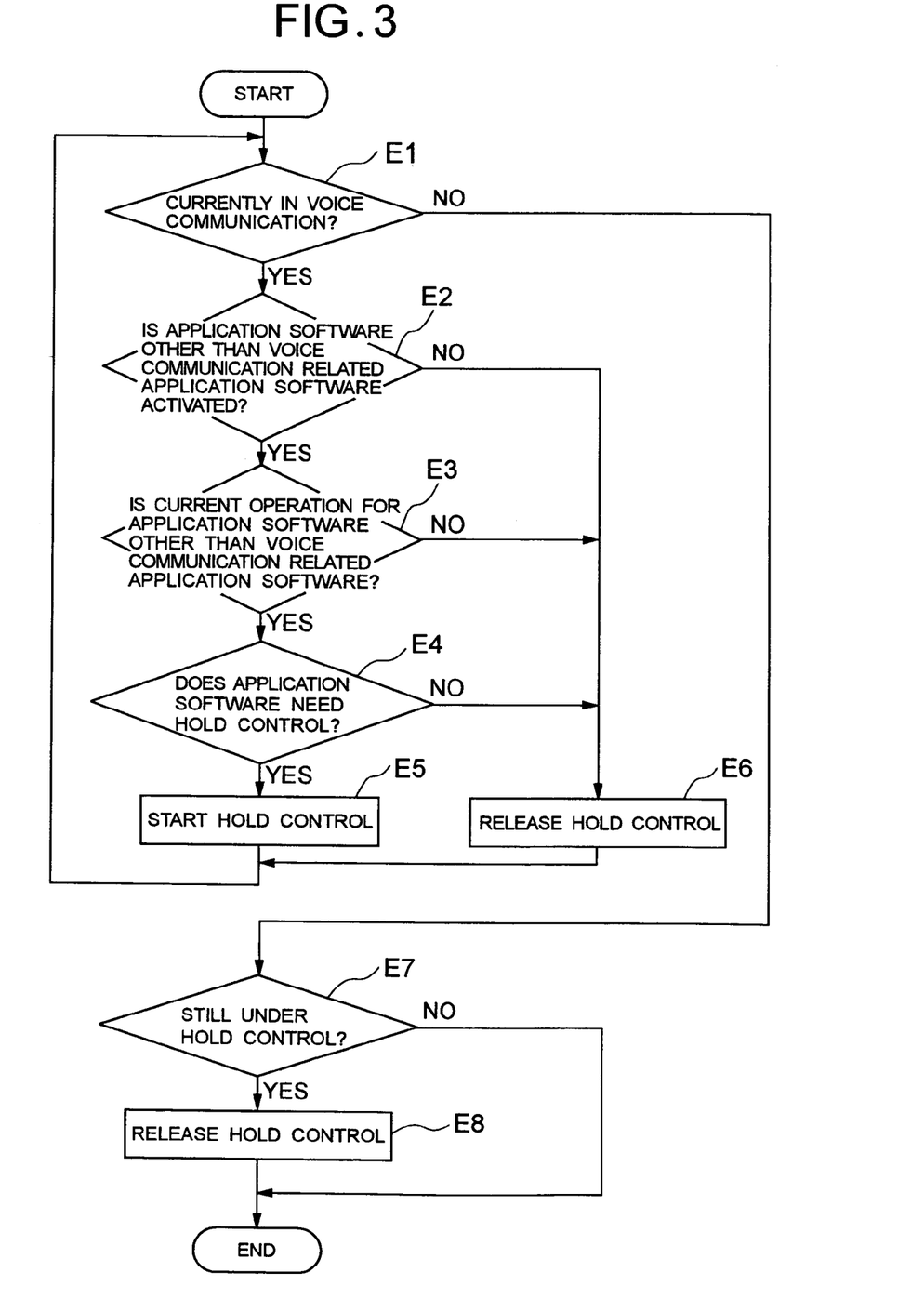
FIG. 3 is a flowchart showing operation of a mobile telephone set shown in FIG. 1 when application software is activated.

FIG. 3 is a flowchart showing operation of the mobile telephone set 1 shown in FIG. 1 when application software is activated. In FIGS. 1, 2 and 3, when application software of the mobile telephone set 1 is activated, the control part 12 confirms whether or not the mobile telephone set 1 is in voice communication with another telephone set (mobile or fixed telephone set) through the communication network 7 (step E1 of FIG. 3). If it is in voice communication ("Yes" at step E1 in FIG. 3), then the control part 12 confirms whether or not application software other than a voice communication related application is activated (step E2 in FIG. 3).

If the application software other than the voice communication related application is activated ("Yes" at step E2 in FIG. 3), then the control part 12 confirms whether or not a user operates the application software other than the voice communication related application (step E3 in FIG. 3). That is, it is confirmed at step E3 whether or not the application software appearing topmost to the user among the pieces of application software currently activated is application software other than the voice communication related application.

If one of the pieces of application software currently activated is e-mail related application software (mailer), and the user operates the mailer using the operation part 21 during voice communication, the screen 200 shown in FIG.

1, for example, is displayed on the display 16 and this mailer is the application software appearing topmost to the user.

On the other hand, if the mailer is activated during voice communication but is not operated by the user, and the application software appearing topmost to the user is voice communication related application software, then not the screen 200 but a screen, which indicates that voice communication is being performed, is displayed on the display 16.

If the application software other than the voice communication related application is operated by the user ("Yes" at step E3 in FIG. 3), then the control part 12 confirms whether or not the application software is application software for which hold control is required (step E4 in FIG. 3). The confirmation at step E4 is done based on the application software management information table in the memory 20.

Figure 6:
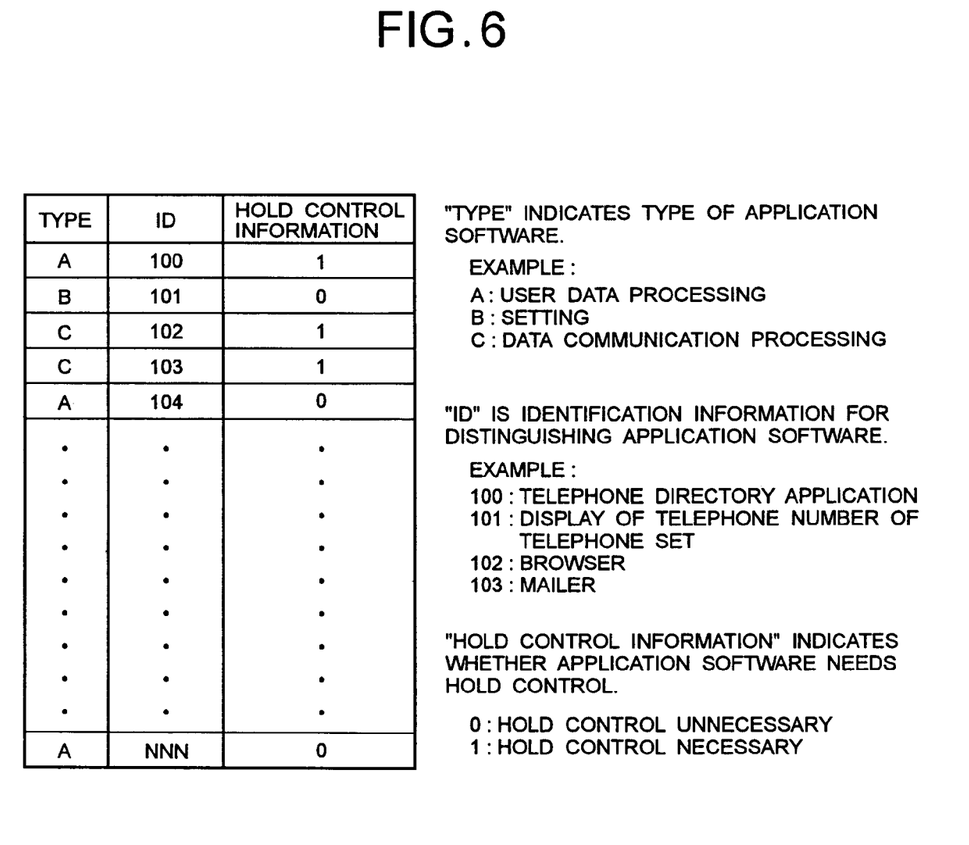
FIG. 6 shows contents of an application software management information table.

FIG. 6 shows the contents of the application software management information table. As shown in FIG. 6, a type, an ID and hold control information are set for each application software of the mobile telephone set 1. The type indicates the type of application software. For example, Type A indicates "user data processing", Type B, "setting", and Type C, "data communication processing".

The ID is identification information for distinguishing application software. For example, ID "100" indicates "telephone directory application software", ID "101", "application software for displaying the telephone set's own telephone number", ID "102", "browser (data communication related application software)", and ID "103", "mailer".

The hold control information indicates whether or not the application software is application software for which hold control is required. The hold control information "0" indicates that hold control is not required, and the hold control information "1" indicates that hold control is required.

For example, if a mailer is operated by the user at step E3, then the control part 12 determines that hold control is required based on the content of the application software management information table shown in FIG. 6 at step E4.

If the application software which is operated by the user is application software for which hold control is required ("Yes" at step E4 in FIG. 3), then hold control is performed to hold voice communication (step E5 in FIG. 3).

Figure 4:
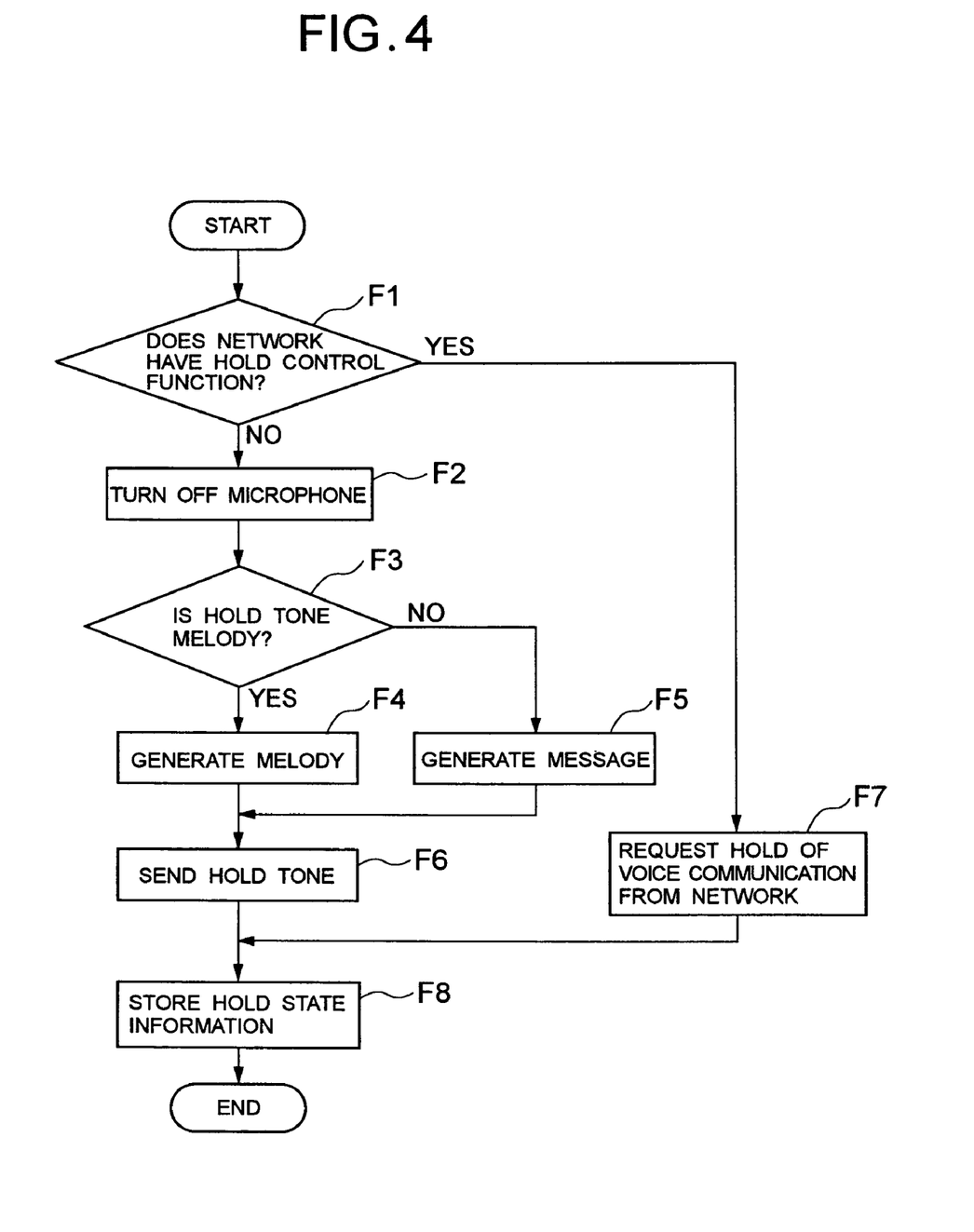
FIG. 4 is a flowchart showing operation of a mobile telephone set shown in FIG. 1 during hold control.

FIG. 4 shows operation of the mobile telephone set 1 during the hold control. In FIGS. 1, 2 and 4, if the communication network 7 has a hold control function of holding voice communication ("Yes" at step F1 in FIG. 4), then the mobile telephone set 1 requests hold of voice communication from the communication network 7 by transmitting a hold request signal to the exchange 3 via the base station 2 under the control of the control part 12 (step F7 in FIG. 4). Thus, the voice communication is held by hold control means (not shown) of the exchange 3 in response to reception of the hold request signal from the mobile telephone set 1. The control part 12 then stores hold state information indicating that the voice communication has been held by the communication network 7 in the memory 20 (step F8 in FIG. 4).

If the communication network 7 does not have the hold control function ("No" at step F1 in FIG. 4), then the control part 12 controls the voice communication control part 17 to turn off the microphone 18 used for voice communication (step F2 in FIG. 4). The control part 12 then confirms whether the hold tone for notifying hold of voice communication is set to melody or to voice message (step F3 in FIG. 4). The user can set the hold tone using the operation part 21.

If the hold tone is set to melody ("Yes" at step F3 in FIG. 4), then the control part 12 causes the melody generating part 14 to generate a melody (step F4 in FIG. 4), and the melody is sent as a hold tone to the telephone set of the speech counterpart via the base station 2 and the exchange 3 (step F6 in FIG. 4).

On the other hand, if the hold tone is set to voice message ("No" at step F3 in FIG. 4), then the control part 12 causes the voice message generating part 13 to generate a voice message (step F5 in FIG. 4), and the voice message is sent as a hold tone to the telephone set of the speech counterpart via the base station 2 and the exchange 3 (step F6 in FIG. 4).

When the hold tone is sent from the mobile telephone set 1 to the speech counterpart and hold of the voice communication is completed, the control part 12 stores hold state information indicating that the voice communication has been held by the mobile telephone set 1 in memory 20 (step F8 in FIG. 4). In this way, the hold control operation ends.

Figure 5:
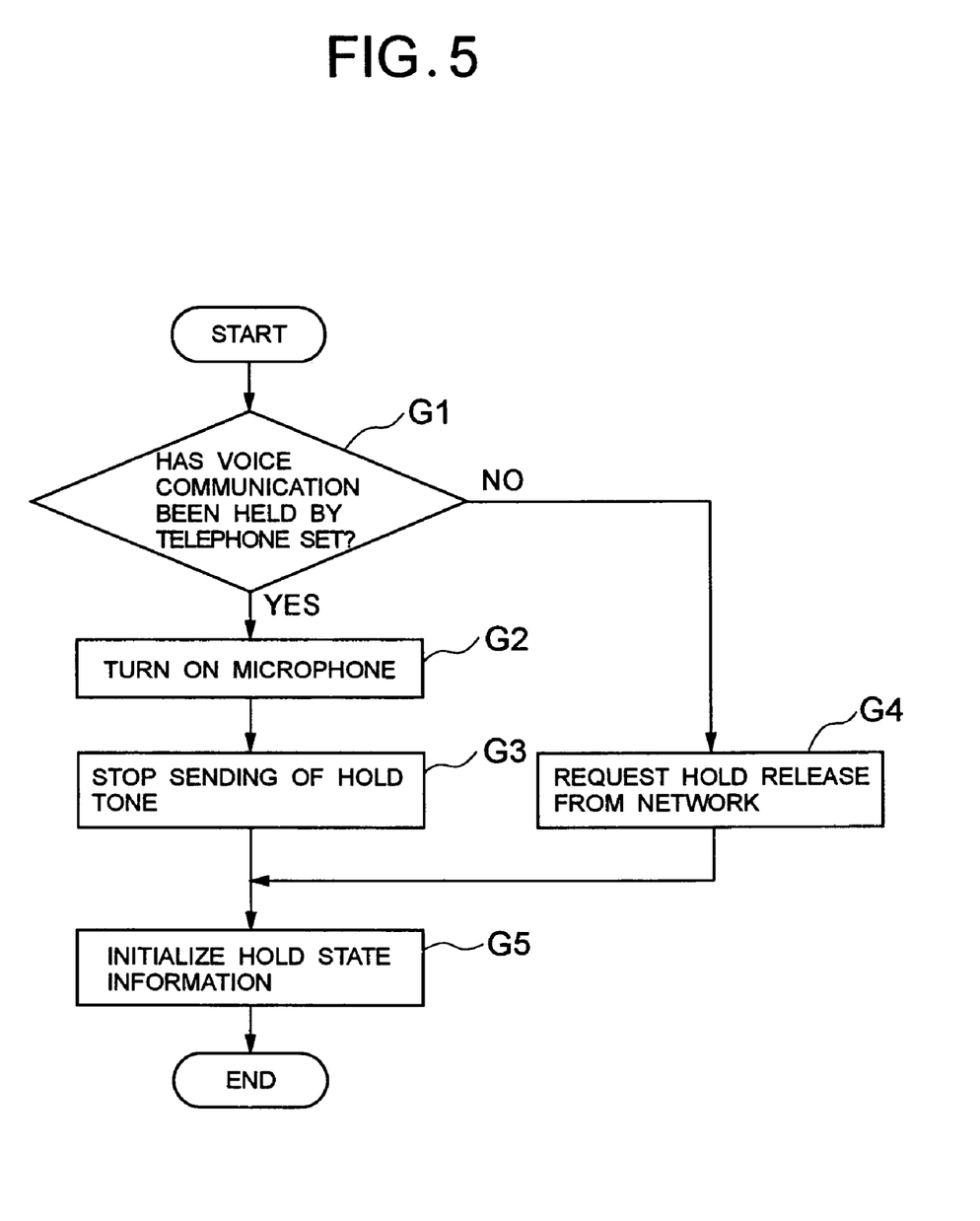
FIG. 5 is a flowchart showing operation of a mobile telephone set shown in FIG. 1 when hold control is released.

Turning to FIG. 3, if it is determined that hold control is not required at even only one of the conditions of steps E2 to E4, then the hold control is released (step E6 in FIG. 3). FIG. 5 shows operation of the mobile telephone set 1 when the hold control is released.

In FIGS. 1, 2 and 5, the control part 12 confirms whether hold control of voice communication has been performed by the mobile telephone set 1 or by the communication network 7 based on hold state information stored in the memory 20 (step G1 in FIG. 5).

If the hold control has been performed by the communication network 7 ("No" at step G1 in FIG. 5), then the mobile telephone set 1 requests release of the hold of voice communication from the communication network 7 by transmitting a hold release request signal to the exchange 3 via the base station 2 under the control of the control part 12 (step G4 in FIG. 5). Thus, the hold of voice communication is released by the hold control means of the exchange 3 in response to reception of the hold release request signal from the mobile telephone set 1. Then, the control part 12 initializes the hold state information in the memory 20 (step G5 in FIG. 5).

On the other hand, if the hold control has been performed by the mobile telephone set 1 ("Yes" at step G1 in FIG. 5), then the control part 12 controls the voice communication control part 17 to turn on the microphone 18 (step G2 in FIG. 5). Sending of the hold tone to the telephone set of the speech counterpart is then stopped (step G3 in FIG. 5), and the hold state information in the memory 20 is initialized (step G5 in FIG. 5). In this way, the hold control release operation ends.

Turning to FIG. 3, the voice communication has not been held in some cases at step E6. In such cases, the process naturally returns to step E1 without any hold control release operation.

If the mobile telephone set 1 is not in voice communication at step E1 ("No" at step E1 in FIG. 3), then the control part 12 confirms the state of hold control (step E7 in FIG. 3) to confirm whether or not voice communication has ended without hold control being released at step E6 after it was provided at step E5. If the hold control is still provided ("Yes" at step E7 in FIG. 3), then it is released similarly to the case of step E6 (step E8 in FIG. 3).

In this way, in the embodiment of the present invention, when a mailer activated during voice communication (voice speech) is operated by the user in order to send an e-mail to a speech counterpart during the voice communication, for example, the voice communication is held, thereby preventing a noise generated by the operation from being sent to the speech counterpart.

In addition, when an activated application other than the voice communication related application is operated during voice communication, the voice communication is held, thereby reducing traffic during the operation.

Furthermore, even when a network does not have a hold control function, the microphone of the mobile telephone set can be turned off and a hold tone (melody or voice message) can be sent from the mobile telephone set to hold voice communication, thereby preventing a noise from being sent.

Though the mobile telephone set 1 has been used in the embodiment of the present invention, the present invention is not limited to a mobile telephone set, and a fixed telephone set typified by an ISDN (Integrated Services Digital Network) terminal can be also used, which is capable of controlling a line used for data communication and a line used for voice communication at the same time. In such a fixed telephone set, it is also possible, when performing an operation for sending and receiving an e-mail during voice communication, for example, to prevent a noise caused by the operation from being sent by holding the voice communication.

The processing operation following each flowchart shown in the above FIGS. 3, 4 and 5 can be naturally implemented by causing a computer having a CPU (control part) to read and execute a program stored in advance in a recording medium such as ROM.

The advantage of the present invention is that a noise generated by an operation of application software during voice communication (voice speech) can be prevented from being sent to a speech counterpart. This is possible because, when a voice communication processing and other processings are activated in a telephone set capable of executing multiple processings in parallel, the telephone set requests hold of the voice communication from the network side in response to a user's operation for the processing other than the voice communication processing, and the network holds the voice communication in response to the request by the telephone set.

Furthermore, even when the network does not have a hold control function of voice communication, voice communication can be held by turning off the microphone for communication provided for a mobile telephone set and sending a hold tone to the speech counterpart of the voice communication via the network.

What is claimed is:

1. A communication system, comprising a telephone set capable of executing a plurality of application programs in parallel and a communication network to which the telephone set is connected;
   the telephone set including hold requesting means for, in response to an operation of activating an application program among said plurality of application programs other than voice communication processing which is activated during voice communication, requesting hold of the voice communication from the network side wherein the hold requesting means determines whether a hold request is required by the application program which is activated based on hold control information of the plurality of application programs; and
   the network including hold control means for, in response to the hold request by the telephone set, holding the voice communication if the hold request is required for the application program which is activated,
   wherein the hold control information indicates whether the hold request is required for each of the plurality of application programs separately.

2. The communication system according to claim 1 wherein the hold control information indicates the hold request is required for at least one application program and the hold control information indicates the hold request is not required for at least one other application program.

3. The communication system according to claim 2, wherein the hold control information is stored in a table which specifies hold control information of each of the plurality of application programs separately, and the hold requesting means determines whether the hold request is required for each application program which is activated during voice communication by referencing said table.

4. The communication system according to claim 2, wherein the hold requesting means requests the hold of the voice communication from the network side if the hold control information which corresponds to the application program which is activated specifies that the hold request is required.

5. The communication system according to claim 1; wherein the telephone set is a mobile telephone set.

6. A communication system, comprising a telephone set capable of executing a plurality of application programs in parallel and a communication network to which the telephone set is connected;
   the telephone set including voice communication control means for controlling voice communication processing; and
   the telephone set further including hold control means for, in response to an operation of activating an application program among said plurality application programs other than voice communication processing which is activated during voice communication, holding the voice communication,
   wherein the hold control means determines whether holding the voice communication is required by the application program which is activated based on hold control information of the plurality of application programs,
   wherein the hold control information indicates whether holding the voice communication is required for each of the plurality of application programs separately.

7. The communication system according to claim 6; the telephone set further including a microphone; wherein the hold control means turns off the microphone and sends a hold tone to a communication counterpart of the voice communication via the network to hold the voice communication.

8. The communication system according to claim 6; wherein the hold control means holds the voice communication if the hold control information which corresponds to the application program which is activated indicates holding the voice communication is required.

9. The communication system according to claim 6, wherein the hold control information indicates holding the voice communication is required for at least one application program and the hold control information indicates that holding the voice communication is not required for at least one other application program.

10. The communication system according to claim 9, wherein the hold control information is stored in a table which specifies hold control information of each of the plurality of application programs separately, and the hold requesting means determines whether holding the voice communication is required for each application program which is activated during voice communication by referencing said table.

11. A hold control method for a communication system comprising a telephone set capable of executing a plurality of application programs in parallel and a communication network to which the telephone set is connected; the method comprising:

a hold requesting step of, in response to an operation of activating an application program among said plurality of application programs other than voice communication processing which is activated during voice communication, requesting hold of the voice communication from the network side, in the telephone set wherein the telephone set determines whether a hold request is required by the application program which is activated based on hold control information of the plurality of application programs; and a hold control step of, in response to the hold request by the telephone set, holding the voice communication, in the network if the hold request is required for the application program which is activated, wherein the hold control information indicates whether the hold request is required for each of the plurality of application programs separately.

12. The hold control method according to claim 11; wherein the hold requesting step requests the hold of the voice communication from the network side if the hold control information which corresponds to the application program which is activated indicates the hold request is required.

13. The hold control method according to claim 11, wherein the hold control information indicates the hold request is required for at least one application program and the hold control information indicates the hold request is not required for at least one other application program.

14. The hold control method according to claim 13, wherein the hold control information is stored in a table which specifies hold control information of each of the plurality of application programs separately, and the hold requesting step further comprises determining whether the hold request is required for each application program which is activated during voice communication by referencing said table.

15. A hold control method for a communication system comprising a telephone set capable of executing a plurality of application programs in parallel and a communication network to which the telephone set is connected; the method comprising:

a hold control step of, in response to a an operation of activating an application program among said plurality of application programs other than voice communication processing which is activated during voice communication, holding the voice communication, in the telephone set wherein the telephone set determines whether a hold request is required by the application program which is activated based on hold control information of the plurality of application programs;

wherein the hold control information indicates whether the hold request is required for each of the plurality of application programs separately.

16. The hold control method according to claim 15; wherein the hold control step turns off a microphone provided for the telephone set and sends a hold tone to a communication counterpart of the voice communication via the network to hold the voice communication.

17. The hold control method according to claim 15; wherein the hold control step holds the voice communication when the application program which is a predetermined application program for which hold control is required.

18. The hold control method according to claim 15, wherein the hold control information indicates the hold request is required for at least one application program and the hold control information indicates the hold request is not required for at least one other application program.

19. The hold control method according to claim 18, wherein the hold control information is stored in a table which specifies hold control information of each of the plurality of application programs separately, and the hold control step further comprises determining whether the hold request is required for each application program which is activated during voice communication by referencing said table.

20. A telephone set capable of executing plurality of application programs in parallel; the telephone set comprising:

voice communication control means for controlling voice communication processing; and hold requesting means for, in response to an operation of activating an application program among said plurality of application programs other than voice communication processing which is activated during voice communication, requesting hold of the voice communication from a communication network to which the telephone set is connected if a hold request is required by the application program which is activated, wherein the hold requesting means determines whether the hold request is required by the application program which is activated based on hold control information of the plurality of application programs, wherein the hold control information indicates whether the hold request is required for each of the plurality of application programs separately.

21. The telephone set according to claim 20; wherein the hold requesting means requests the hold of the voice communication from the network side if the hold control information which corresponds to the application program which is activated indicates that the hold request is required.

22. The telephone set according to claim 20 that is a mobile telephone set.

23. The telephone set according to claim 20, wherein the hold control information indicates the hold request is required for at least one application program and the hold control information indicates the hold request is not required for at least one other application program.

24. The telephone set according to claim 23, wherein the hold control information is stored in a table which specifies hold control information of each of the plurality of application programs separately, and the hold requesting means determines whether the hold request is required for each application program which is activated during voice communication by referencing said table.

25. A telephone set capable of executing a plurality of application programs in parallel; the telephone set comprising:

voice communication control means for controlling voice communication processing; and hold control means for, in response to an operation of activating an application program among said plurality of application programs other than voice communication processing which is activated during voice communication, holding the voice communications, wherein the hold control means determines whether holding the voice communication is required by the application program which is activated base on hold control information of the plurality of application programs, wherein the hold control information indicates whether holding the voice communication is required for each of the plurality of application programs separately.

26. The telephone set according to claim 25; further comprising a microphone; wherein the hold control means turns off the microphone and sends a hold tone to a communication counterpart of the voice communication via a communication network to hold the voice communication.

27. The telephone set according to claim 25; wherein the hold control means holds the voice communication if the hold control information which corresponds to the application program which is activated indicates holding the voice communication is required.

28. The telephone set according to claim 25, wherein the hold control information indicates the hold request is required for at least one application program and the hold control information indicates the hold request is not required for at least one other application program.

29. The telephone set according to claim 28, wherein the hold control information is stored in a table which specifies hold control information of each of the plurality of application programs separately, and the hold control means determines whether the hold request is required for each application program which is activated during voice communication by referencing said table.

30. A control method for a telephone set capable of executing a plurality of application programs in parallel; the control method comprising:

a hold requesting step of, in response to an operation of activating an application program among said plurality of application programs other than voice communication processing which is activated during voice communication, requesting hold of the voice communication from a communication network to which the telephone set is connected, wherein the telephone set determines whether a hold request is required by the application program which is activated based on hold control information of the plurality of application programs, wherein the hold control information indicates whether the hold request is required for each of the plurality of application programs separately.

31. The control method according to claim 30; wherein the hold requesting step requests the hold of the voice communication from the network side if the hold control information which corresponds to the application program which is activated indicates the hold request is required.

32. The control method according to claim 30, wherein the hold control information indicates the hold request is required for at least one application program and the hold control information indicates the hold request is not required for at least one other application program.

33. The control method according to claim 32, wherein the hold control information is stored in a table which indicates hold control information of each of the plurality of application programs separately, and the hold requesting step further comprises determining whether the hold request is required for each application program which is activated during voice communication by referencing said table.

34. A control method for a telephone set capable of executing a plurality of application programs in parallel; the method comprising:

a hold control step of, in response to an operation of activating an application program other than voice communication processing which is activated during voice communication, holding the voice communication, wherein the telephone set determines whether a hold request is required by the application program which is activated based on hold control information of the plurality of application programs;

wherein the hold control information indicates whether the hold request is required for each of the plurality of application programs separately.

35. The control method according to claim 34; wherein the hold control step turns off a microphone provided for the telephone set and sends a hold tone to a communication counterpart of the voice communication via a communication network to hold the voice communication.

36. The control method according to claim 34; wherein the hold control step holds the voice communication if the hold control information which corresponds to the application program which is activated indicates the hold request is required.

37. The control method according to claim 34, wherein the hold control information indicates the hold request is required for at least one application program and the hold control information indicates the hold request is not required for at least one other application program.

38. The control method according to claim 37, wherein the hold control information is stored in a table which specifies hold control information of each of the plurality of application programs separately, and the hold requesting means determines whether the hold request is required for each application program which is activated during voice communication by referencing said table.

39. A recording medium having recorded thereon a program executable on a computer to implement a control method for a telephone set capable of executing a plurality of application programs in parallel;

the program comprising a hold requesting step of, in response to an operation of activating an application program among said plurality of application programs other than voice communication processing which is activated during voice communication, requesting hold of the voice communication from a communication network to which the telephone set is connected wherein the telephone set determines whether a hold request is required by the application program which is activated based on hold control information of the plurality of application programs, wherein the hold control information indicates whether the hold request is required for each of the plurality of application programs separately.

40. The recording medium according to claim 39; wherein the hold requesting step requests the hold of the voice communication from the network side if the hold control information which corresponds to the application program which is activated indicates the hold request is required.

41. The control method according to claim 39, wherein the hold control information indicates the hold request is required for at least one application program and the hold control information indicates the hold request is not required for at least one other application program.

42. The control method according to claim 41, wherein the hold control information is stored in a table which specifies hold control information of each of the plurality of application programs separately, and the hold requesting step further comprises determining whether the hold request is required for each application program which is activated during voice communication by referencing said table.

43. A recording medium having recorded thereon a program executable on a computer to implement a control method for a telephone set capable of executing a plurality of application programs in parallel;

the program comprising a hold control step of, in response an operation of activating an application program among said plurality of application programs other than voice communication processing which is activated during voice communication, holding the voice communication wherein the telephone set determines whether a hold request is required by the application program which is activated based on hold control information of the plurality of application programs, wherein the hold control information indicates whether the hold request is required for each of the plurality of application programs separately.

44. The recording medium according to claim 43; wherein the hold control step turns off a microphone provided for the telephone set and sends a hold tone to a communication counterpart of the voice communication via a communication network to hold the voice communication.

45. The recording medium according to claim 43; wherein the hold control step holds the voice communication if the hold control information which corresponds to the application program which is activated indicates the hold request is required.

46. The control method according to claim 43, wherein the hold control information indicates the hold request is required for at least one application program and the hold control information indicates the hold request is not required for at least one other application program.

47. The control method according to claim 46, wherein the hold control information is stored in a table which specifies hold control information of each of the plurality of application programs separately, and the hold requesting step further comprises determining whether the hold request is required for each application program which is activated during voice communication by referencing said table.

* * * * *